United States Patent [19]

Bernard et al.

[11] Patent Number: 5,002,143
[45] Date of Patent: Mar. 26, 1991

[54] LANDING GEAR STEERING APPARATUS

[75] Inventors: Bouchez Bernard, Palaiseau; Derrien Michel, Versailles, both of France

[73] Assignee: Messier-Hispano-Bugatti, Montrouge, France

[21] Appl. No.: 436,775

[22] Filed: Nov. 15, 1989

[30] Foreign Application Priority Data

Nov. 18, 1988 [FR] France ............... 88 15002

[51] Int. Cl.⁵ .................. B62D 5/06; B64C 25/50
[52] U.S. Cl. ................................ 180/152; 244/50
[58] Field of Search ............ 180/152; 244/50; 92/117 R, 118

[56] References Cited

U.S. PATENT DOCUMENTS

| | | | |
|---|---|---|---|
| 2,958,481 | 11/1960 | Price | 180/152 |
| 3,124,043 | 3/1964 | Kendall et al. | 91/178 |
| 3,430,896 | 4/1969 | Labrecque | 244/103 R |
| 3,904,153 | 9/1975 | Watts | 244/50 |
| 4,313,364 | 2/1982 | Blincoe et al. | 91/176 |

FOREIGN PATENT DOCUMENTS 859585 12/1940 France .

Primary Examiner—Charles A. Marmor
Assistant Examiner—Mitchell Bompey
Attorney, Agent, or Firm—Sixbey, Friedman, Leedom & Ferguson

[57] ABSTRACT

The steering apparatus of the invention comprises a body (4) containing a crank (8) with actuators (12) associated with the crank and free to pivot about respective pivot axes (14). The actuators co-operate with distribution members including feed circuits and return circuits carried by the body and opening out facing at least one actuator face (16) extending perpendicularly to the pivot axis (14) of the actuator, the face including at least one control orifice (17).

6 Claims, 2 Drawing Sheets

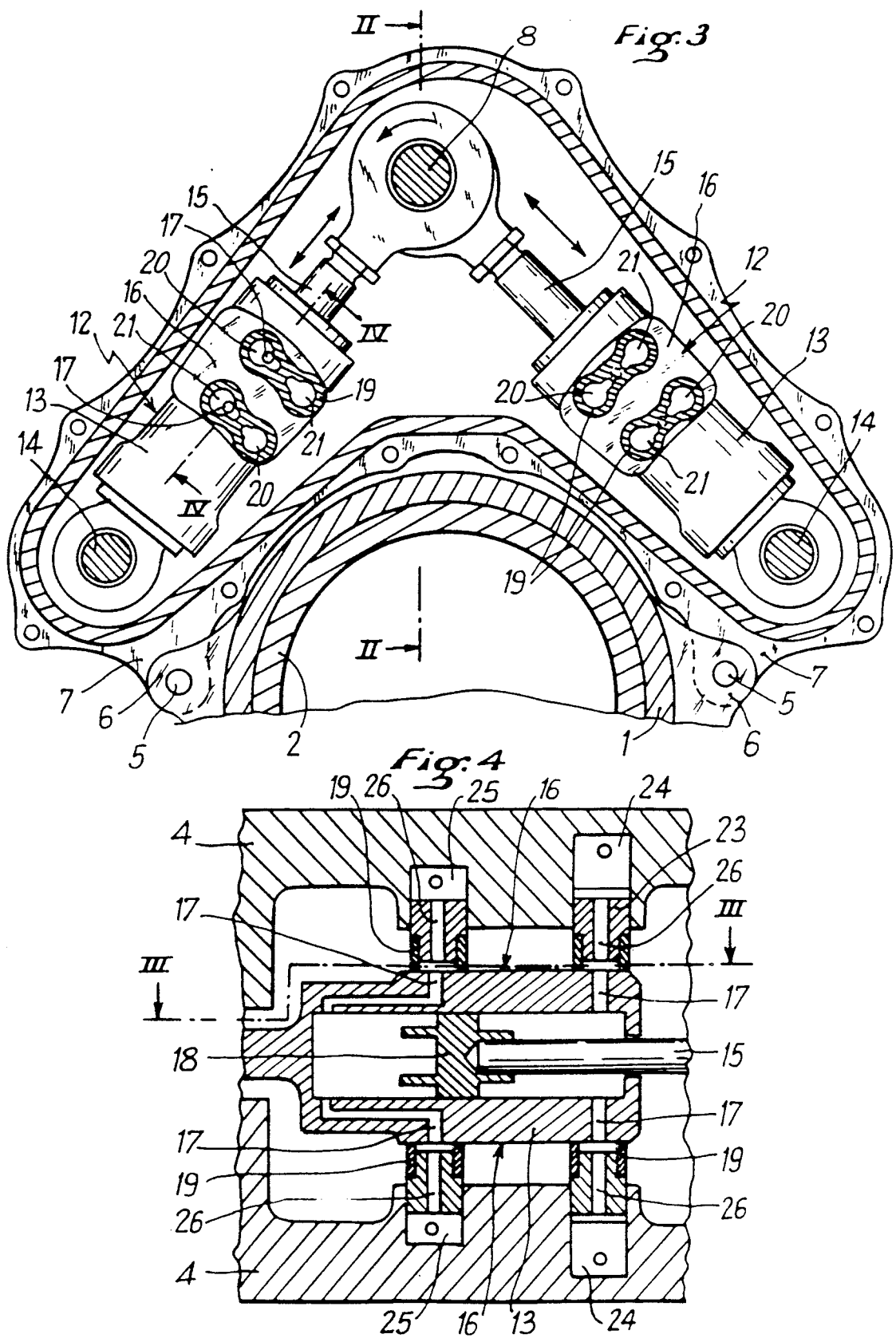

LANDING GEAR STEERING APPARATUS

The present invention relates to landing gear steering apparatus.

BACKGROUND OF THE INVENTION

In order to be able to steer an aircraft while it is running on the ground, it is necessary to provide steerable landing gear, with steering generally being provided for the auxiliary landing gear (nose wheel or tail wheel). Steerable landing gear includes a strut for fixing to the aircraft (generally retractably), with a rotary tube mounted to rotate relative to the strut, and a sliding rod mounted to slide inside the rotary tube and connected thereto by a scissor linkage, with the bottom end of the sliding rod carrying the wheels of the landing gear. In order to steer its wheels, the landing gear includes steering apparatus generally comprising either an actuator fitted with a rack associated with a toothed ring carried by the rotary tube, or else a rotary hydraulic motor fixed to the strut and including a gear wheel engaging with a toothed ring carried by the rotary tube.

U.S. Pat. Nos. US-A-3 124 034 and US-A-4 313 364 both describe landing gear steering apparatuses each comprising a body fixed to a landing gear strut, a crank disposed to rotate inside the body about an axis of rotation parallel to an axis of rotation of a wheel support, link means linking one end of the crank with the wheel support, and at least two actuators extending perpendicularly to the axis of rotation of the crank, each of said actuators having one end hinged to the body to be able to pivot about a pivot axis parallel to the axis of rotation of the crank and one end hinged to a crank pin of the crank, with the actuators being connected to distribution means for distributing a driving fluid. However, in both cases the actuators are fed from distribution members which are complex, thereby reducing maneuvering speed and accuracy of the steering apparatuses.

An object of the present invention is to provide landing gear steering apparatus having distribution means which are simple in structure and which adapt automatically to landing gear steering.

SUMMARY OF THE INVENTION

According to the present invention this object is achieved by crank steering apparatus of the type specified above in which the distribution means comprise feed ducts and return ducts carried by the body and opening out facing at least one face of each actuator, said face extending perpendicular to the pivot axis of the actuator and including at least one control orifice, with the feed ducts and the return ducts being fitted with sealing means for sealing them relative to the facing actuator face. Preferably, the sealing means comprise sliding skids each having one face disposed to slide over an actuator face and carrying differential pistons each having a first end engaged in sealed manner in the sliding skid, a second end of larger section engaged in one of the ducts of the body, and a duct interconnecting the two ends. Thus, during rotation of the crank, the oscillations of the actuators automatically put them into reciprocating communication with the feed ducts and the return ducts.

According to an advantageous aspect of the invention, the distribution means are associated with two opposite faces of each of the actuators. In this way, the actuators are subjected to symmetrical forces by the distribution means, thereby minimizing shear stresses on the pivot axes of the actuators.

BRIEF DESCRIPTION OF THE DRAWINGS

An embodiment of the invention is described by way of example with reference to the accompanying drawings, in which:

FIG. 3 is a plan view in partial section on line III—III of FIGS. 2 and 4; and

FIG. 4 is a view on a larger scale, partially in section on line IV—IV of FIG. 3.

DETAILED DESCRIPTION

Figure 1:
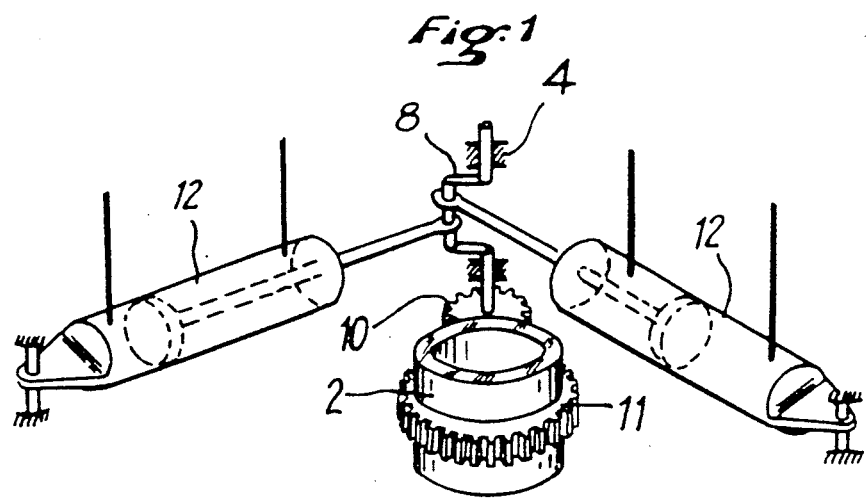
FIG. 1 is a partially cut-away diagrammatic perspective view of apparatus in accordance with the invention.

With reference to the figures, the steering apparatus of the invention is intended to be mounted on landing gear including a strut 1 suitable for being fixed to an aircraft, a rotary tube 2 mounted to rotate inside the strut 1 about an axis of rotation of the rotary tube, and a sliding rod 3 mounted to slide inside the rotary tube 2 for supporting the wheels of the landing gear and connected to the rotary tube via a scissor linkage (not shown). The steering apparatus of the invention comprises a body 4, in this case constituted by a two-part housing with the parts interconnected in appropriate manner, fixed to the strut 1, e.g. by means of bolts 5 passing through lugs 6 and 7 fixed respectively to the strut 1 and to the body 4.

The body 4 is symmetrical about a vertical plane including the axis of the strut 1. A crank given a general reference 8 is mounted inside the body 4 on bearings 9 to rotate about a crank axis of rotation parallel to the axis of rotation of the rotary tube 2. The bottom end of the crank carries a gear wheel 10 which meshes with a toothed ring 11 fixed to the rotary tube 2.

Figure 2:
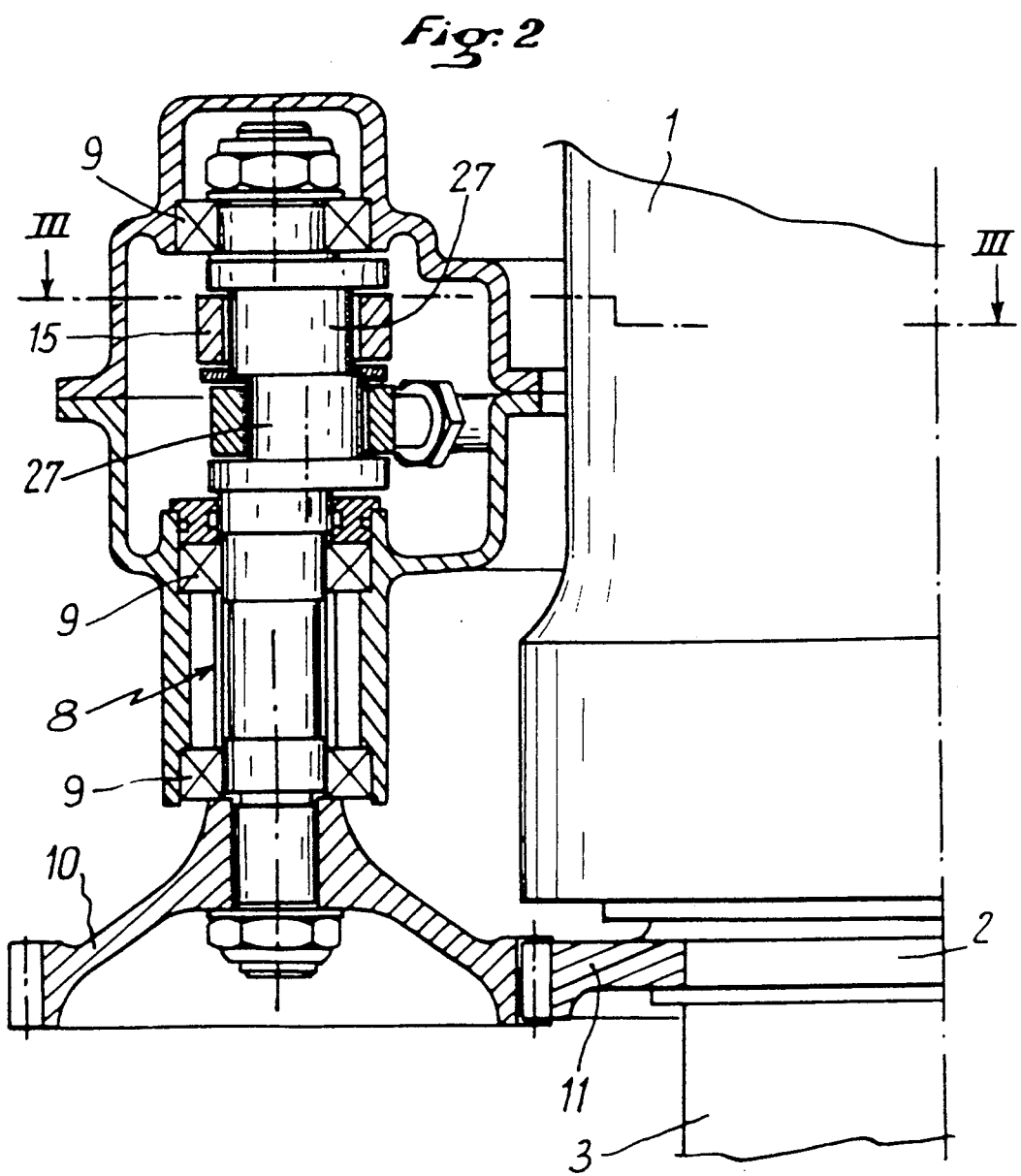
FIG. 2 is a side view in partial section on a vertical plane II—II of FIG. 3 showing a preferred embodiment of the invention.

Two actuators given general references 12 are mounted inside the body 4, with each actuator comprising a cylinder 13 whose rear end is mounted to pivot about a pivot axis 14 carried by the body 4, and a rod 15 whose free end is mounted to pivot about a crank pin 27 of the crank 8. Thus, as can be seen in FIGS. 2 and 3, the actuators 12 are disposed to oscillate on both sides of respective mean directions which are perpendicular to each other, and there are two crank pins 27 which are offset relative to each other through an angle of about 30° about the axis of rotation of the crank 8.

Each of the actuators 12 has two polished opposite faces 16 extending perpendicularly to its pivot axis 14 and pierced by two control orifices 17, one of which is in communication with a front face of the actuator piston 18, whereas the other of which is in communication with a rear face of the piston 18. Sliding skids 19 are mounted to bear against the polished faces 16 of the actuators and they include feed openings 20 and return openings 21 disposed in a diagonal configuration. Differential pistons 23 each have a first end engaged in sealed manner in one of the openings through a sliding skid 19 and a second end of larger section engaged in a feed duct 24 or a return duct 25 extending through the body 4. The differential pistons 23 also have respective link channels 26 running therethrough between the corresponding duct in the body 4 and the facing opening through the sliding skid 19. The feed ducts 24 and the return ducts 25 are appropriately connected to those hydraulic circuits of the aircraft which are associated with members for controlling landing gear steering.

The apparatus of the invention operates as follows: when control fluid is applied to the feed ducts 24, pressure acts on the differential pistons 23, thereby pressing the sliding skids 19 against the facing polished faces 16 of the actuators 12. The differential pistons 23 and the sliding skids 19 thus constitute means for sealing the feed ducts relative to the facing faces of the actuators. Depending on the position of the actuator about its pivot axis 14, each actuator is then fed either to extend or else to retract its actuator rod 15. For example, in the position shown in FIG. 3, the left actuator (FIG. 4) has each of its front control orifices 17 facing an opening 20 through the sliding skid 19 and associated with a feed duct 24 whereas each of its rear controlled orifices faces an opening 21 associated with a return duct 25. The piston 18 of the left actuator is thus subjected to differential pressure causing the rod 15 to be retracted. Simultaneously, the actuator rod 15 of the righthand actuator is fully extended and the cylinder 13 of this actuator lies exactly on the axis of the facing sliding skids 19. In this position, all four control orifices 17 are covered by the central portions of the sliding skids, and are therefore not in communication either with the feed ducts or with the return ducts. Retraction of the left actuator rod 15 causes the crank 18 to rotate, thereby simultaneously pivoting the right actuator cylinder 13 so that its front control orifices come to look into the feed openings 20 associated with the feed ducts, whereas its rear control orifices come to look into the openings 21 associated with the return duct 25, etc. When the feed ducts 24 are under pressure, the crank is automatically caused to rotate, thereby rotating the rotary tube via the gear wheel 10 and the toothed ring 11.

When it is desired to tow the aircraft leaving the landing gear free to swivel depending on the towing direction, then the feed ducts and the return ducts are all connected to the hydraulic fluid return tank of the aircraft. The pistons 18 then move freely within the actuators and the crank is free to take up any position imposed thereon by the wheels during movement of the aircraft on the ground.

Naturally, the invention is not limited to the embodiment described and variants may be made thereto without going beyond the scope of the invention. In particular, although it has been observed that it is preferable for the actuators to be disposed along two mean directions which are perpendicular to each other in order to improve the regularity of the torque transmitted to the crank 8 by the actuators, and to dispose the crank pins 16 excentrically at an angle of about 30° relative to the axis of rotation of the crank, thereby further improving regularity, other actuator dispositions may be adopted if the above-described disposition is unsatisfactory with respect to overall bulk of the steering apparatus.

We claim:

1. Landing gear steering apparatus comprising a body fixed to a strut of the landing gear, a crank disposed to rotate inside the body about an axis of rotation parallel to a swivel axis of a wheel support, link means linking the crank in rotation with the wheel support, and at least two actuators extending perpendicularly to an axis of rotation of the crank, each of said actuators having one end hinged to the body in order to pivot about a corresponding pivot axis extending parallel to the axis of rotation of the crank, and one end hinged to a crank pin of the crank, and at least one polished face mounted for sliding movement with respect to a corresponding polished face of the body, said body comprising feed ducts and return ducts opening in said polished face of the body, wherein said polished face of said actuator extends perpendicular to the pivot axis of the actuator and includes at least one control orifice, and the feed ducts and the return ducts include sealing means for sealing them relative to the polished face of said actuator.

2. Steering apparatus according to claim 1, wherein the sealing means comprises sliding skids each having one face disposed to slide over the polished face of the actuator and carrying differential pistons each having a first end sealingly engaged in the sliding skid, a second end of larger cross-section engaged in one of the ducts of the body, and a duct interconnecting the two ends.

3. Steering apparatus according to claim 1, wherein each of said actuators include two polished faces mounted for sliding movement with respect to a respective corresponding polished face of the body, with each of said polished faces of said actuator including control orifices which communicate with corresponding feed ducts and return ducts of said body.

4. Steering apparatus according to claim 3, wherein said polished faces of the actuator extend substantially parallel to one another.

5. Steering apparatus according to claim 2, wherein each of said actuators include two polished faces mounted for sliding movement with respect to a respective corresponding polished face of the body, with each of said polished faces of said actuator including control orifices which communicate with corresponding feed ducts and return ducts of said body.

6. Steering apparatus according to claim 5, wherein said polished faces of the actuator extend substantially parallel to one another.

* * * * *